Figure 1:
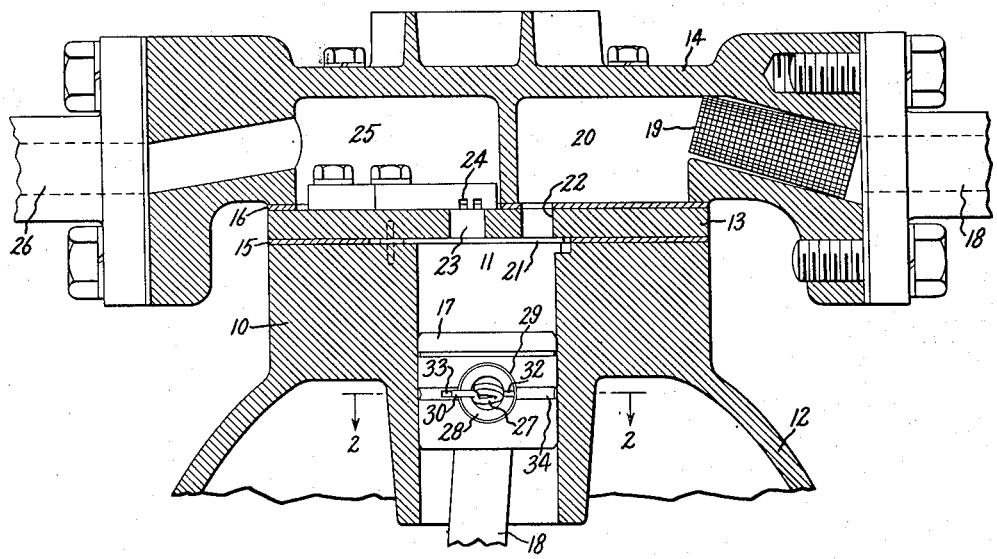

Inventor:
Charles A. Dubberley,
by *William G. Edwards, Jr.*
His Attorney.

Patented Dec. 22, 1953

2,663,601

UNITED STATES PATENT OFFICE 2,663,601

PISTON ASSEMBLY FOR RECIPROCATING COMPRESSORS

Charles A. Dubberley, Fort Wayne, Ind., assignor to General Electric Company, a corporation of New York Application November 28, 1950, Serial No. 197,988

4 Claims. (Cl. 309—19)

1

This invention relates to reciprocating compressors and the like and particularly to a locking device for securing a removable wrist pin in position within the piston.

Reciprocating pistons such as those employed in gas compressors commonly are provided with wrist pins on which are journaled the connecting rods by which the pistons are driven from suitable cranks. For purposes of assembly and servicing of the mechanism, it is desirable that the wrist pins be readily removable, and, in some compressor designs, it is also necessary that the pins be locked in position in a manner to prevent undue wear. Heretofore, various locking devices have been provided for this purpose, and among these devices have been forms of resilient ties or clamps; however, for various reasons, these devices have not been entirely satisfactory, and, accordingly, it is an object of this invention to provide an improved readily removable resilient locking device for securing a wrist pin within a piston in a manner which will positively prevent relative movement between the pin and the piston during operation.

It is a further object of this invention to provide an improved resilient locking mechanism for securing a wrist pin within a piston and which shall be simple and effective in operation and which shall be easy to install and remove.

Further objects and advantages of the invention will become apparent as the following description proceeds, and the features of novelty which characterize the invention will be pointed out with particularity in the claims annexed to and forming a part of this specification.

In carrying out the objects of this invention, a piston is provided with wrist pin openings in which is mounted a removable hollow cylindrical wrist pin. A resilient locking device or key is provided within the hollow pin and comprises a coiled spring having a single central coil of two turns and diverging arms with their ends bent at right angles to provide converging end portions. The wrist pin and piston are provided with complementary slots or recesses adjacent the ends of the wrist pin, these being located in a plane normal to the axis of the piston, and the slot or recess in the piston being preferably in alignment with an oil groove of the piston. When the locking device is inserted in the hollow wrist pin, it is compressed so that the spring is stressed and is then pushed into place so that the ends enter the complementary slots at the two ends of the piston, the forces exerted being such that the ends of the locking device grip the piston and positively prevent relative movement between the pin and the piston.

Figure 2:
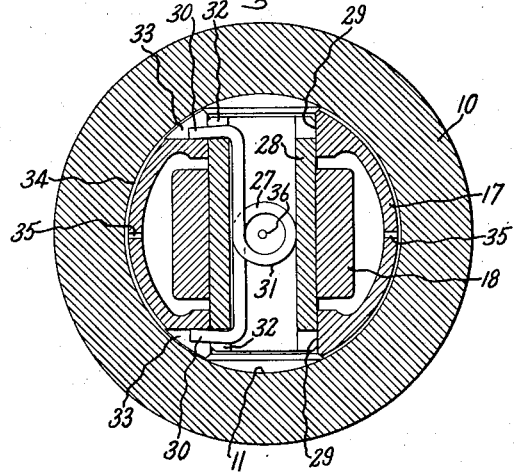

For a better understanding of this invention, reference may be had to the accompanying drawing in which Fig. 1 is a sectional view of a portion of a gas compressor such as those employed for refrigerators provided with a reciprocating piston embodying this invention; Fig. 2 is an enlarged sectional view on the line 2—2 of Fig. 1; and Fig. 3 is a view of the locking element in its unstressed condition before insertion in the assembly.

Referring now to the drawing, the compressor shown in Fig. 1, comprises a block 10 having a cylinder bore 11 and mounted on a base in any suitable manner, a portion 12 of the base being shown which provides a crankcase in accordance with the usual practice. A valve plate 13 and a cylinder head 14 are mounted on the block 10, suitable gaskets 15 and 16 being provided to seal the plate with the cylinder block and head. A reciprocating piston 17 is mounted in the cylinder and is actuated by a connecting rod 18 driven by a crankshaft in the usual manner (not shown). On the suction stroke of the compressor, gas is drawn in through an intake connection 18 having a filter screen 19 and enters an intake chamber 20 from which it is drawn into the cylinder, a reed type intake valve 21 being provided to control the intake port indicated at 22. On the return stroke of the piston, the gas is compressed in the cylinder and is discharged through a discharge port 23 and a reed type discharge valve 24 and then passes through a discharge chamber 25 to an outlet connection 26.

Compressors such as those employed in hermetically sealed refrigerating machines operate at relatively high speeds and, to prevent noise and wear, it is particularly desirable in some designs that there be no mechanical movement between the engaging surfaces of the piston and wrist pin. Furthermore, it is desirable, for purposes of manufacturing and replacing parts of the piston assembly, that the piston and wrist pin may be readily assembled and disassembled. One of the satisfactory mechanisms for assuring continuous locked engagement of the wrist pin and piston is to provide some form of resilient lock or clamp which may be removed for servicing of the unit. In order to provide a resilient locking device which may readily be detached and also may easily be installed to lock the wrist pin and piston, the assembly shown in the drawing is provided with a resilient locking element 27 mounted on the wrist pin 28 journaled in wrist pin openings 29 in the piston. The pin 28 is in the form of a hollow cylinder, and the element 27 fits within this hollow portion and has end portions 30 extending through registering slots in the wrist pin and piston to lock the pin in position.

Figure 3:
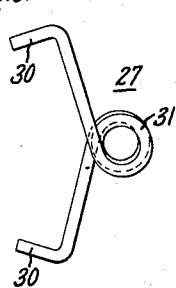

The details of construction of the locking mechanism will be more readily understood by reference to Figs. 2 and 3. As clearly shown in Fig. 2, the locking element 27 comprises a wire spring having a coiled portion 31 accommodated within the hollow portion of the pin 28 and two arms extending towards the ends of the writ pin with end portions 30 passing through the complementary recesses in the pin and piston, as indicated at 32 and 33 respectively. The recesses or slots 33 in the piston adjacent the ends of the wrist pin are formed in alignment with an annular oil groove 34 in the piston, and the ends 30 of the locking element 27 extend into the slots 33 but do not extend to the outer edges of the slots. Suitable orifices 36 in wrist pin 28 are provided to admit oil, pumped through a passage in the connecting rod (not shown) to the cavity within the wrist pin. From this cavity, the oil flows out each end of the wrist pin, where it enters the oil groove 34 and flows between piston and cylinder wall. Orifices 35 allow excess oil and gas to escape groove 34, thus providing a continuous flow of lubricant around the periphery of the piston. It will be noted that in Fig. 2 the ends 30 converge slightly and grip the adjacent edges of the piston within the slots 33. This gripping action is brought about by tension in the spring 27 which is compressed upon insertion within the wrist pin. In its normal or unstressed form, the element 27 has a configuration indicated in Fig. 3, the two arms of the element diverging with respect to one another from the coil 31 and the ends 30, which are bent at right angles to the arms of the element, thus converge. When the element is pressed into the position within the hollow wrist pin, the coil 31 engages the inner side of the wrist pin remote from the slots 33 and presses the arms toward the opposite side of the hollow pin. When the element has been pressed sufficiently far to permit the end first inserted to enter the slot 32, the element snaps into position, both ends 30 then being in their respective slots 32 and extending into the slots 33 in alignment with the slots 32. In this position of the pin, the entire assembly is gripped tightly, the element 27 normally engaging the wrist pin at three points, first where the coil 31 contacts the wall of the bore and the other where the ends engage the edge of the pin adjacent the slots 32. The action of the locking element 27 in gripping the piston between the ends 30 positively locks the wrist pin in position and prevents both rotary and axial motion of the pin within the pin openings and thereby prevents fretting or wearing of the pin surface during operation of the piston. At the same time, the locking element may easily be removed, since the open slots provide access to the ends 30, either of which may be passed out of position, and the element moved into the bore of the wrist pin from which it is readily removable by pulling on its opposite end. It is only necessary to insert the element so that the ends enter the slots 32 and are in alignment with the slots 33. Obviously, this may readily be done with simple tools.

While a particular application of the locking device and assembly has been shown, other arrangements will occur to those skilled in the art.

It is desired, therefore, not to limit the invention to the specific configuration shown and described, and it is intended by the appended claims to cover all modifications within the spirit and scope of the invention.

What I claim as new and desire to secure by Letters Patent of the United States is:

1. A piston assembly for reciprocating compressors and the like comprising a piston having transverse wrist pin openings and open slots extending laterally from its outer wall into respective ones of said openings, a hollow wrist pin mounted in said openings and having open radial slots at its ends registering with said slots in said piston, and a resilient locking element held under stress in the hollow of said pin and having its ends positioned adjacent opposite ends of said pin and extending through corresponding ones of the slots in said pin and said piston and resiliently gripping said piston between said locking element ends whereby said pin is held securely in position in said piston against both rotation and longitudinal movement and said element may be readily released and removed from either end of said pin.

2. A piston assembly for reciprocating compressors and the like comprising a piston having transverse wrist pin openings and open slots extending laterally from its outer wall into respective ones of said openings, a hollow wrist pin mounted in said openings and having open radial slots at its ends registering with said slots in said piston, and a resilient locking element held under torsional stress in the hollow of said pin, said locking element comprising a double-ended spring member having a coiled portion intermediate its ends and lying in a plane substantially longitudinal of said pin, the ends of said spring being bent substantially at right angles and passing through corresponding ones of said registering slots, said element in its unstressed condition having said ends converging whereby when said element is forced into position within said pin said ends cooperate to grip said piston adjacent said slots and resiliently retain said pin against rotation and against movement longitudinally of said pin.

3. A piston assembly for reciprocating compressors and the like comprising a piston having transverse wrist pin openings and open slots extending laterally from its outer wall into respective ones of said openings, a hollow wrist pin mounted in said openings and having open radial slots at its ends registering with said slots in said piston, and a resilient locking element held under torsional stress in the hollow of said pin, said locking element in its unstressed condition comprising a spring member having diverging arms terminating in ends bent to converge with respect to one another, said element in its stressed condition within said pin having its ends passing through corresponding ones of said registering slots into engagement with said piston adjacent said slots whereby said element is resiliently held within said pin and resiliently grips said piston between said locking element ends to prevent relative movement between said pin and said piston.

4. A piston assembly for reciprocating compressors and the like comprising a piston having a skirt provided with an annular oil groove and transverse cylindrical wrist pin openings having their common longitudinal axis extending diametrically of said groove, said piston having open slots extending from said groove into the end portions of said wrist pin openings, a hollow wrist pin mounted in said openings and having open radial slots at its ends registering with said slots in said piston, and a resilient locking element held under stress in the hollow of said pin and having its ends positioned adjacent opposite ends of said pin and extending through corresponding ones of the slots in said pin and said piston and resiliently gripping said piston between said locking element ends whereby said pin is held securely in position in said piston against both rotation and longitudinal movement and said element may be released readily and removed from either end of said pin.

CHARLES A. DUBBERLEY.

References Cited in the file of this patent

UNITED STATES PATENTS

| Number | Name | Date |
|---|---|---|
| 1,568,833 | Harris | Jan. 5, 1926 |
| 2,213,884 | Ohmart | Sept. 3, 1940 |
| 2,418,901 | Read | Apr. 15, 1947 |